Patented Apr. 9, 1929.

1,708,100

UNITED STATES PATENT OFFICE.

HERMAN PAUL KERNEN, OF WILMETTE, ILLINOIS.

PROCESS OF MAKING CHEESE.

No Drawing.     Application filed November 21, 1927.   Serial No. 234,913.

This invention relates to improvements in the process of making cheese; and more especially to such a process for making a sterile cheese directly from milk.

One of the features of my invention is the fact that by the use of my improved process cheese can be made in a very short space of time. Heretofore, it was considered necessary, in the making of cheese to permit the curd to stand for some time to give the requisite acid development. By the old methods of making cheese, if this acid development was carried out by artificial means or hastened, the resulting cheese would be imperfect and non-marketable as it would not have the necessary consistency but would break up and disintegrate, or the acid development would continue to produce a sour or undesirable flavor. In my improved process, however, the acid development may be carried out artificially and hastened so that the complete time for the manufacture of cheese may be considerably shortened; and at the same time the completed cheese has the requisite consistency and is a perfect marketable and palatable product in every respect, and also being sterile the acid development is stopped at the right point so that the desired flavor remains.

Another feature of my invention is the fact that by the use of my process the completed cheese is sterile, thus making it keep better and longer under different climatic conditions.

Other features and advantages of my invention will appear more fully as I proceed with my specification.

In the practice of my invention, I take preferably fresh whole milk, cook the same to approximately 85° F., cool it if desired, and coagulate the same by rennet extract, pepsin, or similar substance to a jelly mass in the usual manner. It is desirable to use about double the usual amount of rennet. I then cut the jelly mass into small pieces of substantially the same size, heat for about thirty minutes to from 100° to 105° F., stirring while heating, to form curds, and continue to stir the curds in the whey for about two hours. I then remove the excess whey and moisture from the curds in any one of the well known methods, depending upon the kind of resulting cheese desired.

I then allow the curds to ripen for about two to twenty hours, the time depending upon the acidity contained in the milk and the desired flavor in the resulting cheese. Applying the hot iron test, the curds should show an acidity of from one and one-half to two and one-half inches of dry acid. After ripening, the curd is preferably salted.

I then heat the curds to from 120° to 150° F., preferably adding an emulsifying agent, for example, sodium citrate. I hold the mass at this heat from about fifteen to thirty minutes, stirring or agitating continuously. During this time, I add enough water to make up for evaporation losses. During this heating, I also add from one-quarter to one-half of one percent, by weight, of calcium phosphate; from one-quarter to one-half of one percent of calcium lactate, and from one-quarter to one-half of one percent of ammonium citrate. I preferably add some salt. These ingredients give very quickly the flavor of a mild American cheese ripened in the old natural way by standing on the factory shelf several days or weeks. One of the important features of my invention is the development of this flavor in a relatively short space of time. By my process, sterile cheese may be made directly from milk by one continuous process and be ready for consumption in, from ten to twelve hours. The cheese being sterile, the acid development is practically stopped so that the cheese does not become sour or develop a disagreeable taste. The stirring or agitating prevents the cheese from disintegrating and keeps a smooth and homogeneous mass.

By the use of my invention, an improved brick cheese may also be made, preferably without coloring matter. Such a cheese ordinarily would have a higher moisture content to the extent of approximately 4% to 5% more moisture. Since brick cheese is ordinarily preferred milder in flavor, the three chemicals used are preferably kept at a minimum, probably not over one-eight of one percent by weight. The quantity of salt used should also be smaller.

One of the features of this invention is the making of a sterile cheese directly from milk in one continuous process without having a non-sterile cheese at any time. Heretofore sterile cheese has only been made by re-cooking or sterilizing completed factory made cheese.

Although I have described a particular process for carrying out my invention, it is to be understood that variations may be made in the same without departing from the spirit and scope of my invention as embodied in the claims in which it is my desire to claim all novelty inherent in my invention as broadly as possible, in view of the prior art.

What I claim as new, and desire to secure by Letters Patent, is:

1. The process of making cheese comprising, coagulating the milk, forming the curds, adding calcium phosphate, sterilizing the mass, and allowing the same to cool.

2. The process of making cheese comprising, coagulating the milk, forming the curds, adding calcium phosphate, sterilizing the mass while stirring the same, and allowing the same to cool.

3. The process of making cheese comprising, coagulating the milk, forming the curds, adding calcium phosphate, sterilizing the mass while stirring the same in the presence of an emulsifying agent, and allowing the same to cool.

4. The process of making cheese comprising, coagulating the milk, forming the curds, adding calcium phosphate and calcium lactate, sterilizing the mass, and allowing the same to cool.

5. The process of making cheese comprising, coagulating the milk, forming the curds, adding calcium phosphate and calcium lactate, sterilizing the mass while stirring the same, and allowing the same to cool.

6. The process of making cheese comprising, coagulating the milk, forming the curds, adding calcium phosphate and calcium lactate, sterilizing the mass while stirring the same in the presence of an emulsifying agent, and allowing the same to cool.

7. The process of making cheese comprising, coagulating the milk, forming the curds, adding calcium phosphate, calcium lactate and ammonium citrate, sterilizing the mass, and allowing the same to cool.

8. The process of making cheese comprising, coagulating the milk, forming the curds, adding calcium phosphate, calcium lactate and ammonium citrate, sterilizing the mass while stirring the same, and allowing the same to cool.

9. The process of making cheese comprising, coagulating the milk, forming the curds, adding calcium phosphate, calcium lactate and ammonium citrate, sterilizing the mass while stirring the same in the presence of an emulsifying agent, and allowing the same to cool.

10. The process of making a cheese comprising, coagulating the milk, forming the curds, adding about three-eighths of one percent, by weight, of calcium phosphate, heating the mass to about 125° F. for about twenty-five minutes while stirring the same, and allowing the same to cool.

11. The process of making a cheese comprising, coagulating the milk, forming the curds, adding about three-eighths of one percent, by weight, of calcium phosphate, heating the mass to about 125° F. for about twenty-five minutes while stirring the same in the presence of an emulsifying agent, and allowing the same to cool.

12. The process of making a cheese comprising, coagulating the milk, forming the curds, adding about three-eighths of one percent, by weight, of calcium phosphate and about three-eighths of one percent of calcium lactate, heating the mass to about 125° F. for about twenty-five minutes while stirring the same, and allowing the same to cool.

13. The process of making a cheese comprising, coagulating the milk, forming the curds, adding about three-eighths of one percent, by weight, of calcium phosphate and about three-eighths of one percent of calcium lactate, heating the mass to about 125° F. for about twenty-five minutes while stirring the same, and allowing the same to cool.

14. The process of making a cheese comprising, coagulating the milk, forming the curds, adding about three-eighths of one percent, by weight, of calcium phosphate, three-eighths of one percent of calcium lactate and about three-eighths of one percent of ammoninum citrate, heating the mass to about 125° F. for about twenty-five minutes while stirring the same, and allowing the same to cool.

15. The process of making a cheese comprising, coagulating the milk, forming the curds, adding about three-eighths of one percent, by weight, of calcium phosphate, three-eighths of one percent of calcium lactate and about three-eighths of one percent of ammonium citrate, heating the same to about 125° F. for about twenty-five minutes while stirring the same in the presence of an emulsifying agent, and allowing the same to cool.

16. The process of making a sterile cheese directly from milk consisting of, coagulating the milk, forming the curd, ripening the same in a relatively short space of time by the addition of chemicals, sterilizing the mass while agitating the same, and allowing the same to cool.

In witness whereof, I have hereunto set my hand this 26th day of September, 1927.

HERMAN PAUL KERNEN.